Figure 1:
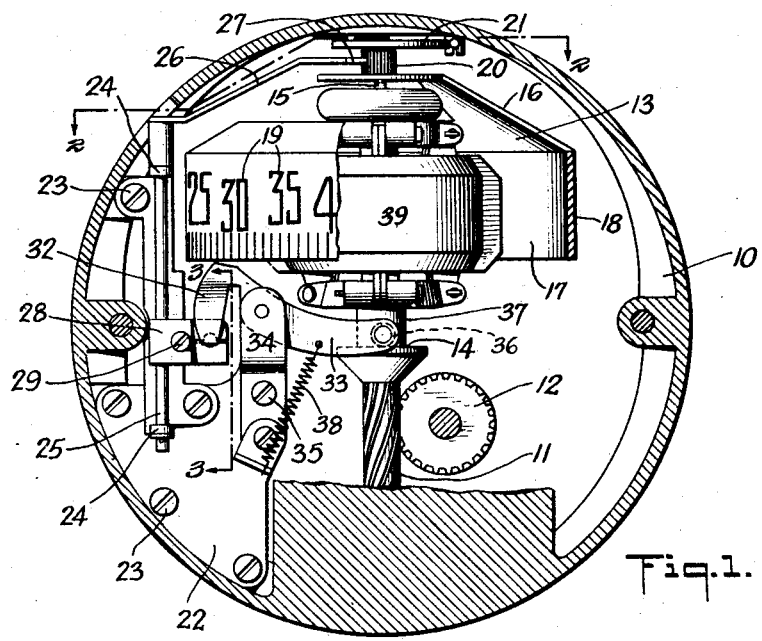

Jan. 3, 1928.

F. W. WEST 1,654,714

DRUM TYPE SPEEDOMETER DRIVE

Filed July 6, 1923

INVENTOR

Frank William West

BY Warren S. Orton.

ATTORNEY

Patented Jan. 3, 1928.

1,654,714

UNITED STATES PATENT OFFICE.

FRANK WILLIAM WEST, OF NEW ROCHELLE, NEW YORK, ASSIGNOR, BY MESNE ASSIGNMENTS, TO STEWART-WARNER SPEEDOMETER CORPORATION.

DRUM-TYPE SPEEDOMETER DRIVE.

Application filed July 6, 1923. Serial No. 649,878.

The invention relates in general to a speedometer of the type in which a speed controlled, centrifugally actuated reciprocatory member acts in its linear movement in one direction through power translating mechanism to rotate an indicator into position to indicate some function of speed of the member controlling the centrifugally actuated member, and the invention specifically relates to an improvement in the mechanism for translating the reciprocatory movement of the centrifugally actuated runner usually found in such instruments into rotary movement of an indicator herein shown to be of the drum type.

The primary object of the invention is to provide a simplified type of speedometer mechanism and incidentally to simplify and accordingly cheapen the motion translating mechanism between the runner and indicator of such instruments.

A difficulty inherent in all speedometers of the type under discussion, is the providing of some simple form of mechanism which will be positive in its actuation, which will be promptly responsive to variations in the speed and which will insure the correct indication of the speed measured. Errors in the reading of the indicators are introduced by the mechanical parts used, for instance, at progressively succeeding speeds the centrifugally controlled runner moves different linear distances and this non-uniform travel of the runner contributes to inaccuracies in indication, especially noticeable where the indicator is graduated with equal distances between succeeding speed indications. Further, there are mechanical variations in parts presumed to be alike, and unless extreme care is taken, both in the manufacturing and assembling of the parts the indicator will not give accurate readings. This necessitates the providing of some means for calibrating the instrument before it is placed on the market and usually such means are expensive both in manufacturing cost and care necessary to set them.

Accordingly, one of the objects of the present invention is to provide a simplified means for insuring a correct reading of the indicator at the different speeds at which the indicator is marked, and incidental to this desideratum it is further intended to provide a calibrating means which can be set roughly to correspond to all instruments of one type and which can be readily adjusted to correct any slight variation in size of standardized parts which go to make up the driving connection.

Still another object of the invention is to provide a form of speedometer with the mechanical parts mounted in the casing in such way that the parts can be compactly assembled and at the same time provide for the maximum accessibility for repair, adjustment or inspection of those parts which are most likely to become worn.

Another object of the invention is to provide a form of driving connection between the runner and the indicator which can be assembled as a complete unit and installed in position and adjusted without effecting the centrifugal actuated parts or the indicator parts.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 2:
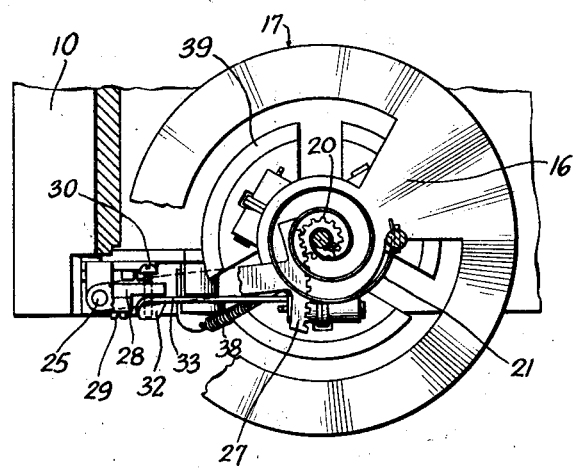
Figure 3:
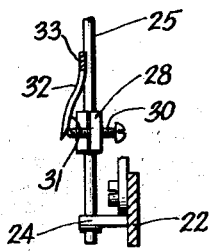

Figure 1 is a transverse sectional view taken axially of the main driving shaft through a speedometer of conventional form showing a preferred embodiment of the invention installed therein;

Figures 2 and 3 are transverse sectional views taken respectively on the lines 2—2 and 3—3 of Figure 1 looking in the directions indicated by the arrows.

In the drawings there is shown a mechanism containing frame or casing 10, preferably designed with open ends and mounted in which casing is a vertically extending main driving and governor shaft 11 geared to an odometer mechanism 12. Pivotally mounted on the upper end of the shaft is a governor 13 operatively connected to a runner 14 slidably mounted on the shaft 11 and controlled by the movement of the governor when acting under the speed influence of the main driving shaft. In position above the main driving shaft and in axial alignment therewith is an indicator spindle 15 journalled at opposite ends in parts of the frame 10. A drum indicator 17 is secured to the spindle 15 by means of a flange 16. The indicator is provided on its peripheral flange 18 with equally spaced speed indications 19. The spindle 15 is designed to be rotated by a pinion 20 secured thereto and the indicator is returned to its normal zero position by means of a spiral spring 21 which has one end secured to the spindle and the other end secured to the casing 10 as more clearly shown in Figure 2. It will be understood in general that the construction as thus far described follows somewhat along conventional lines and all possible parts are mounted in place and otherwise the instrument is complete, ready for the mounting of the insert, particularly constituting the subject-matter of this disclosure.

The insert comprises a mounting plate 22 secured in position on the frame 10 by means of screws 23, preferably located so as to be easily accessible from either of the open ends of the frame. Rotatably mounted in bearings 24 formed on the plate 22 is a vertically disposed rocking shaft 25, from the upper end of which extends an arm 26 in overlapped relation to the drum indicator 17 and provided on its free end with a segmental rack 27 in meshed engagement with the pinion 20 to form a rack and pinion connection between the shaft 25 and the spindle 15.

The shaft 25 is provided approximately on a level with the runner 14 with a laterally projecting extension 28 in the form of a strap encircling the shaft and secured thereto by means of a clamping screw 29. The extension is provided adjacent its outer end with a transversely extending bearing screw 30, adapted to be adjusted into bearing relation with a cam face 31 formed on one side of a shaft rotating bearing cam 32. This cam constitutes one end of a horizontally extending camming lever 33 fulcrumed intermediate its length on a readily demountable support 34 secured by screws 35 to one side of the plate 22. The other end of the lever is provided with a horizontally extending roller 36 engaging in the peripheral groove 37 usually found on runners of the type herein illustrated. From this construction it is apparent that the movement of the runner upwardly from the showing in Figure 1 will cause the lever to rock in a plane parallel to the axis of rotation of the main shaft. The end of the lever forming the cam 32 is bent to form a sharp angle with the plane of rotation of the lever, as more particularly shown in Figure 3. In general it will be sufficient to make the cam face 31 flat but for extreme refinement in the speed readings of the indicator, the cam face may be designed so as to give absolutely correct indicator reading at the different speeds being measured. It is suggested practice to rotate the main shaft or other part, the speed of which is to be indicated, at succeeding known speeds and to set the indicator at the corresponding speed indications. Then by suitably bending the cam to insure the proper degree of contact between the cam face at this point and the head of the bearing screw there results a form of cam face which will thereafter insure a proper reading of the indicator at the different speeds.

One form of camming face so determined by tests is shown in the drawings and resembles a long almost flat concaved curve straight at its free end. However, it is obvious that this form of cam face will be different for different speeds, for different types of governors and in general will be influenced by all of the mechanical factors which go to make up the speedometer mechanism.

While the movement of the runner assisted by the indicator spring 21 will be ordinarily sufficient to maintain the camming lever in correct position, it is herein suggested that a lever controlling spring 38 be connected to the lever and to the support 34 in such way as to cause the roller 36 to bear at all times on the lower flange of the runner. From this construction it will be understood that the spring 21 acts primarily to return the indicator to its normal position and also acts through the arm 26, shaft 25, and cam 32 to maintain the bearing screw 30 in proper bearing engagement with the cam face of the speed controlled cam.

The drum indicator is hollow and for the purpose of economizing in space the weight elements 39 forming the governor 13 are contained largely within the outlines of the drum. The drum is made of sufficient diameter to encircle the governor weights in all operative positions of the same and in this way the periphery of the drum may be almost as large as the casing permits.

In operation and assuming that the rotation of the main drive shaft 11 causes the governor weights to move upward and thus raise the runner from the position shown in Figure 1, motion is transmitted through the mechanism carried by the replaceable unit to rotate the indicator. Described more in detail it is seen that upward movement of the runner acts against the tension of both springs to lift the adjacent end of the lever, causing the cam at the opposite end of the lever to bear on the screw carried by the rocking shaft. The progressive downward movement of the cam on the set screw causes the same to rotate the shaft over an angle depending upon the travel of the runner, and upon the configuration of the cam surface. This movement of the rocking shaft acts through the rack and pinion connection to rotate the indicator against the tension of its controlling spring. The collapse of the governor weights lowers the runner and the indicator spring will tend to restore the indicator back to its normal zero position. As the screw 30 wears away in use it may be advanced to cause the resetting of the indicator to its zero position. The cam may be formed of a readily bendable material and especially when the cam is formed flat it can be adjusted to give at least approximately true readings of the indicator.

Having thus described my invention, I claim:

1. In a speedometer, the combination with a governor shaft, a centrifugally actuated governor pivoted to the shaft and turning therewith, a runner slidably mounted on the shaft and operatively connected to be controlled in its sliding movement by the governor, a driven indicator provided with a mounting spindle aligned with the governor shaft, a rocking shaft offset from the indicator and paralleling the governor shaft, a segmental rack and pinion connection between the rocking shaft and the indicator spindle, an extension projecting radially from the rocking shaft and a camming lever pivoted intermediate its ends with one end engaged by the runner and rocked by the runner in its movement in one direction, the other end being in bearing engagement with the extension to rotate the rocking shaft and thus cause the indicator to function.

2. In a speedometer, the combination with a governor shaft, a centrifugally actuated governor pivoted to the shaft and turning therewith, a runner slidably mounted on the shaft and operatively connected to be controlled in its sliding movement by the governor, a driven indicator provided with a mounting spindle aligned with the governor shaft, a rocking shaft offset from the indicator and paralleling the governor shaft, a segmental rack and pinion connection between the rocking shaft and the indicator spindle, an extension projecting radially from the rocking shaft and a camming lever pivoted intermediate its ends with one end engaged by the runner and rocked by the runner in its movement in one direction, the other end being in bearing engagement with the extension to rotate the rocking shaft and thus cause the indicator to function, a spring acting on the indicator tending to restore the same to its normal zero position and a spring acting on the lever tending to move the same away from its bearing engagement with the extension.

3. In a speedometer, the combination of an indicator, a shaft mounted for rotary movement and operatively connected to the indicator to turn the same, a speed controlled runner mounted for reciprocatory movement, said shaft provided with a bearing screw offset from the axis of rotation of the shaft, a cam actuated by the runner and disposed in bearing engagement with the end of the screw and said screw being adjustable to vary the point of connection between the cam and the indicator rotating shaft.

Signed at New Rochelle, in the county of Westchester and State of New York, this 20th day of June, A. D. 1923.

FRANK WILLIAM WEST.